United States Patent
Williams

(10) Patent No.: US 7,130,664 B1
(45) Date of Patent: Oct. 31, 2006

(54) USER-BASED SIGNAL INDICATOR FOR TELECOMMUNICATIONS DEVICE AND METHOD OF REMOTELY NOTIFYING A USER OF AN INCOMING COMMUNICATIONS SIGNAL INCORPORATING THE SAME

(76) Inventor: Daniel P. Williams, 2340 N. Commonwealth Ave., Apt. 305, Chicago, IL (US) 60614-3450

( * ) Notice: Subject to any disclaimer, the term of this patent is extended or adjusted under 35 U.S.C. 154(b) by 554 days.

(21) Appl. No.: 10/250,204

(22) Filed: Jun. 12, 2003

(51) Int. Cl.
*H04B 1/38* (2006.01)
*H04M 1/00* (2006.01)

(52) U.S. Cl. .................. 455/567; 455/412.2; 455/466; 455/41.2; 455/421; 340/574; 340/539.16; 340/384.6; 340/531; 340/693.2; 379/102.3; 379/40; 709/206; 709/224

(58) Field of Classification Search ................ 455/466, 455/412.2, 421, 41.2; 340/539.16, 384.6, 340/531, 539.1, 693.2; 379/102.03, 40; 709/206, 224
See application file for complete search history.

(56) References Cited

U.S. PATENT DOCUMENTS

| | | | |
|---|---|---|---|
| 3,755,663 A | 8/1973 | George, Jr. | |
| 3,805,047 A | 4/1974 | Dockstader | |
| 4,076,976 A | 2/1978 | Fenton | |
| 4,096,552 A | 6/1978 | Ben-Porat | |
| 4,101,955 A | 7/1978 | DuNah | |
| 4,297,677 A | 10/1981 | Lewis et al. | |
| 4,421,953 A | 12/1983 | Zielinski | |
| 4,769,656 A | 9/1988 | Dickey | |
| 4,779,172 A | 10/1988 | Jimenez et al. | |
| 4,791,536 A | 12/1988 | James | |
| 4,803,487 A | 2/1989 | Willard et al. | |
| 4,930,052 A | 5/1990 | Beige | |
| 5,007,105 A | 4/1991 | Kudoh et al. | |
| 5,201,578 A | 4/1993 | Westmoreland | |
| 5,477,433 A | 12/1995 | Ohlund | |
| 5,491,486 A * | 2/1996 | Welles et al. | .......... 342/357.07 |
| 5,722,071 A | 2/1998 | Berg et al. | |
| 5,752,203 A | 5/1998 | Yamashita | |
| 5,848,362 A | 12/1998 | Yamashita | |
| 5,886,669 A | 3/1999 | Kita | |
| 5,896,096 A | 4/1999 | Kim | |
| 5,953,677 A * | 9/1999 | Sato | ........................... 455/574 |
| 5,960,367 A | 9/1999 | Kita | |
| 6,067,460 A * | 5/2000 | Alanara et al. | ............. 455/574 |
| 6,164,815 A | 12/2000 | Degonda | |
| 6,175,729 B1 | 1/2001 | He et al. | |
| 6,181,237 B1 | 1/2001 | Gehlot | |
| 6,184,796 B1 | 2/2001 | Rivero et al. | |
| 6,218,958 B1 | 4/2001 | Eichstaedt et al. | |
| 6,219,540 B1 * | 4/2001 | Besharat et al. | ............. 455/421 |

(Continued)

*Primary Examiner*—Marceau Milord
(74) *Attorney, Agent, or Firm*—McGarry Bair PC

(57) ABSTRACT

The present invention provides a remote notification device in electronic communication with a user's personal communication device that alerts the user that the personal communication device is receiving an incoming telecommunications signal. A user who is not in operable contact with the communication device is alerted to the incoming call, message, or page by the remote notification device, which is in operable contact with the user, and alerts the user with a suitable indication (e.g., visual, audible, and/or tactile). The remote notification device preferably permits the user to not alter his or her desired appearance in social situations. The remote notification device is easily concealable or integral to an article of clothing, piece of jewelry, piercing, or accessory that the user desires to wear or carry independent of the desire to be notified of incoming calls, messages, or pages.

69 Claims, 7 Drawing Sheets

U.S. PATENT DOCUMENTS

| | | |
|---|---|---|
| 6,238,119 B1 | 5/2001 | Liu |
| 6,249,222 B1 | 6/2001 | Gehlot |
| 6,263,218 B1 | 7/2001 | Kita |
| 6,272,359 B1 | 8/2001 | Kivela et al. |
| 6,296,364 B1 | 10/2001 | Day et al. |
| 6,337,978 B1 * | 1/2002 | Inoue .................. 455/421 |
| D454,551 S | 3/2002 | Bonadei et al. |
| 6,373,439 B1 | 4/2002 | Zurcher et al. |
| 6,385,460 B1 * | 5/2002 | Wan .................. 455/515 |
| 6,424,251 B1 | 7/2002 | Byrne |
| 6,578,981 B1 | 6/2003 | Jackson et al. |
| 6,594,370 B1 | 7/2003 | Anderson |
| 6,650,231 B1 | 11/2003 | Byrne |
| 6,819,247 B1 * | 11/2004 | Birnbach et al. ........ 340/573.1 |
| 6,882,870 B1 | 4/2005 | Kivela et al. |
| 6,940,956 B1 * | 9/2005 | Leach .................. 379/106.01 |
| 2002/0032020 A1 | 3/2002 | Brown et al. |
| 2002/0086714 A1 | 7/2002 | Wang |
| 2002/0115478 A1 | 8/2002 | Fujisawa et al. |
| 2004/0031287 A1 | 2/2004 | Leason et al. |
| 2004/0057578 A1 | 3/2004 | Brewer |
| 2004/0185915 A1 | 9/2004 | Ihara et al. |
| 2004/0204153 A1 | 10/2004 | Benco et al. |
| 2005/0113081 A1 | 5/2005 | Tushinsky et al. |

* cited by examiner

USER-BASED SIGNAL INDICATOR FOR TELECOMMUNICATIONS DEVICE AND METHOD OF REMOTELY NOTIFYING A USER OF AN INCOMING COMMUNICATIONS SIGNAL INCORPORATING THE SAME

BACKGROUND OF INVENTION

1. Field of the Invention

The present invention relates to the field of personal communication devices such as cellular phones and pagers, and in particular to the field of remote notification devices that alert users of personal communication devices of incoming calls, messages, or pages.

2. Description of the Related Art

Modern personal communication devices, such as cellular phones and pagers, typically alert users of an incoming call, message, or page with some sort of signal. These signals generally take the form of an audible ring, a vibration, a visual signal such as a light, or some combination of the foregoing. These signals typically originate from the cellular phone or pager itself. In most social situations, this type of notification is adequate, as the user is within sight of, able to hear, or in physical contact with their cellular phone or pager.

The balance of this statement of the problem will be stated in terms of an incoming call to a cellular phone, though the concepts apply equally to a pager or other personal communication device, such as a conventional cordless phone.

People in loud, crowded places such as bars or dance clubs are often neither within sight of, able to hear, nor in physical contact with their cellular phone. For example, for reasons of preference, style, protection of the phone, security, and convenience, women at crowded bars often prefer to keep their cellular phones in their purses rather than in a pocket or on a table or the bar. These women often cannot see their cellular phone because it is contained within an opaque purse. Nor can these women hear their cellular phone ring, due to ambient noise from such sources as music and other patrons. And these women are obviously not in physical contact with their cellular phones while those phones are in their purses, hence the vibrate option on their cellular phone is incapable of notifying them of the incoming call. As a result of this decision to place their cellular phone in their purses, many women miss many incoming calls. This causes inconvenience, disruption to social lives, and has the potential to render these women unreachable in important and emergency situations. There is a need for a device to alert these cellular phone users to the fact that their cellular phone is currently receiving an incoming call.

Cellular phones are well known. Furthermore, there are certain devices in the art remote from cellular phones that alert users to an incoming call. These devices typically take the form, however, of an earpiece or headset designed to allow the user to receive and conduct a phone call without holding the phone to the user's ear. The purpose of these devices is to free the user's hands for other tasks such as driving a car, working at a computer, taking notes, or handling documents. An example of this type of device is the JABRAA®Earsetâ¢, described at http://www.jabra.com/products/earset.htm. While these devices do free their users from having to be within sight, able to hear, or in physical contact with their cellular phones, they do not meet the needs that are met by the present invention.

The cellular phone users for which the present invention was conceived typically women at loud, crowded bars and clubs do not want to wear an earpiece or a headset while socializing. On the occasions that women go to bars and clubs, they design their appearance by selecting certain clothes, jewelry, shoes, makeup, and other accessories. Among the reasons that women choose to keep their cellular phones in their purses is the fact that they often choose not to wear clothes that would provide a pocket adequate for a cellular phone. Furthermore, even if they choose to wear an outfit having such a pocket, they would rather not keep their cellular phone in the pocket, for reasons of comfort and appearance. In short, aesthetics are important, and the appearance of the earpieces and headsets described above are aesthetically undesirable in the social situations for which the present invention is designed. While it is important to solve the problem of missed calls, it is also important to provide an incoming-call remote notification device that does not disrupt women's desired appearance.

There is a need for a device that alerts a cellular phone user of an incoming call, message, or page in situations where the user is neither in sight of, able to hear, nor in physical contact with their cellular phone, without negatively impacting the user's desired appearance.

SUMMARY OF INVENTION

The present invention provides a remote notification device that alerts a user of a personal communication device such as a cellular phone or pager of an incoming call, message, or page in situations where the user is neither in sight of, able to hear, nor in physical contact with their personal communication device, without altering the user's desired appearance.

In one aspect, the invention relates to a personal communications system comprising: a telecommunications device capable of both receiving a first incoming communication signal and generating a second indicator signal representative of the presence of the first incoming communication signal; and a remote notification device associated with a user of the telecommunications device and operably interconnected thereto for detecting the second indicator signal and providing a sensory indication to the user upon detection of the second indicator signal. A user located out of sensory contact with the telecommunications device can thereby receive the sensory indication from the remote notification device when the telecommunications device receives the first incoming communication signal.

Various embodiments of the system invention are also contemplated. The operable communication between the telecommunications device and the remote notification device can be a wireless link. The first incoming communication signal can comprise at least one of an incoming page and an incoming telephone call to the telecommunications device. The first incoming communication signal can be received via a first telecommunications protocol and the second indicator signal can be generated via a second telecommunications protocol, the second telecommunications protocol being different than the first telecommunications protocol.

The remote notification device can be worn integral to the skin of a user. The remote notification device can be worn on a dermal patch removably mounted to the skin of a user. The remote notification device can be configured to have a decorative appearance.

The remote notification device can be worn integral to a bodily-worn accessory of a user. The bodily-worn accessory can be a watch, a bracelet, an anklet, and/or a ring. The bodily-worn accessory can be an accessory received in a body piercing. The bodily-worn accessory can be eyeglasses.

The sensory indication can be visual. The sensory indication can be audible. The sensory indication can be tactile.

The remote notification device can be worn with a bodily-worn clothing of a user. The remote notification device can be clipped to a bodily-worn clothing of a user.

The remote notification device can be worn integral to a bodily-carried accessory of a user. The bodily-worn accessory can be at least one of a carry bag and a purse.

In another aspect, the invention relates to an indicator for a user of a telecommunications device, the telecommunications device capable of both receiving a first incoming communication signal and generating a second indicator signal representative of the presence of the first incoming communication signal, the remote notification device comprising a remote notification device associated with the user of the telecommunications device and adapted to be operably interconnected thereto for detecting the second indicator signal and providing a sensory indication to the user upon detection of the second indicator signal. A user located out of sensory contact with the telecommunications device thereby receives the sensory indication from the remote notification device when the telecommunications device receives the first incoming communication signal.

Various embodiments of the device described herein according to the invention are also contemplated. The remote notification device can be adapted to be operably interconnected to the telecommunications device by a wireless link. The first incoming communication signal can comprise at least one of an incoming page and an incoming telephone call to the telecommunications device. The first incoming communication signal can be received via a first telecommunications protocol and the second indicator signal can be generated via a second telecommunications protocol. The second telecommunications protocol can be different than the first telecommunications protocol.

The remote notification device can be worn integral to the skin of a user. The remote notification device can be worn on a dermal patch removably mounted to the skin of a user. The remote notification device can be configured to have a decorative appearance.

The remote notification device can be worn integral to a bodily-worn accessory of a user. The bodily-worn accessory can be a watch, a bracelet, an anklet, and/or a ring. The bodily-worn accessory can be an accessory received in a body piercing. The bodily-worn accessory can be eyeglasses.

The sensory indication can be visual. The sensory indication is audible. The sensory indication can be tactile.

The remote notification device can be worn with a bodily-worn clothing of a user. The remote notification device can be clipped to a bodily-worn clothing of a user.

The remote notification device can be worn integral to a bodily-carried accessory of a user. The bodily-worn accessory can be at least one of a carry bag and a purse.

In a further aspect, the invention relates to a method of remotely notifying a user of the presence of an incoming signal originated from a telecommunications transmitter to a telecommunications device associated with the user when the user is out of sensory contact with the telecommunications device, the method comprising the steps of: providing a remote notification device in sensory contact with the user; generating a notification signal to the remote notification device representative of the incoming signal between the telecommunications transmitter and the telecommunications device; and detecting the presence of the signal representative of the incoming signal.

Various embodiments of the method described herein are also contemplated according to the invention. The can further comprise the step of notifying the user by sensory contact of the presence of the signal representative of the incoming signal. The notifying step can further comprise the step of providing a visual sensory indication to the user. The notifying step can further comprise the step of providing an audible sensory indication to the user. The notifying step can further comprise the step of providing a tactile sensory indication to the user.

The method can further comprise the step of operably coupling the telecommunications device and the remote notification device by a wireless link. The first incoming signal can comprise at least one of an incoming page and an incoming telephone call to the telecommunications device.

The method can further comprise the step of wearing the remote notification device integral to the skin of the user. The remote notification device can be worn on a dermal patch removably mounted to the skin of a user. The remote notification device can be configured to have a decorative appearance. The method can further comprise the step of wearing the remote notification device integral to a bodily-worn accessory of a user. The method can further comprise the step of wearing the remote notification device with a bodily-worn clothing of a user. The method can further comprise the step of wearing the remote notification device integral with a bodily-carried accessory of a user. The notification signal can originate with the telecommunications transmitter. The notification signal can originate with the telecommunications device.

DETAILED DESCRIPTION

Figure 1:
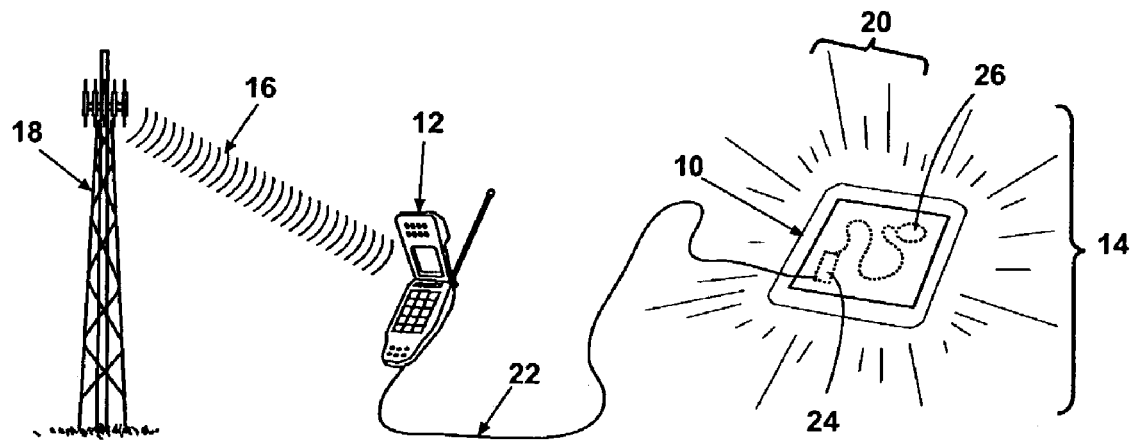
FIG. 1 is a schematic view showing a telecommunications device having a remote notification device associated with a user for indicating the presence of an incoming telecommunication signal to the user the user is out of at least one of physical, audible and visual contact with the telecommunications device according to the invention.

Referring now to the drawings and to FIG. 1 in particular, an invention relating to a user-based signal indicator 10 for a telecommunications device 12 is shown which integrally incorporates a method of remotely notifying a user 14 (see FIGS. 3–6 for more detailed views of user 14) of an incoming communications signal 16 from a telecommunications transmitter 18. The user 14 is notified of the incoming signal 16 by any suitable signal which can provide an immediate notification (i.e., an emitted signal 20) to a user 14 in operable contact with the indicator 10, including, but not limited to, visual indication, audible indication, and tactile indication (e.g., vibratory notice).

A link, i.e., the operable interconnection between the indicator 10 and the user's telecommunications device 12, is shown by example in FIG. 1 by reference numeral 22. The link can be any suitable communications protocol, which includes both wired- and wireless-based protocols, including, but not limited to any IEEE standard, any TCP/IP standard, any networking standard, any telephony standard, any wireless standard (including but not limited to the BLUETOOTHÂ®protocol), and the like. Further specific examples of usable protocols need not be presented here as they will be apparent to one skilled in the art.

Figure 2:
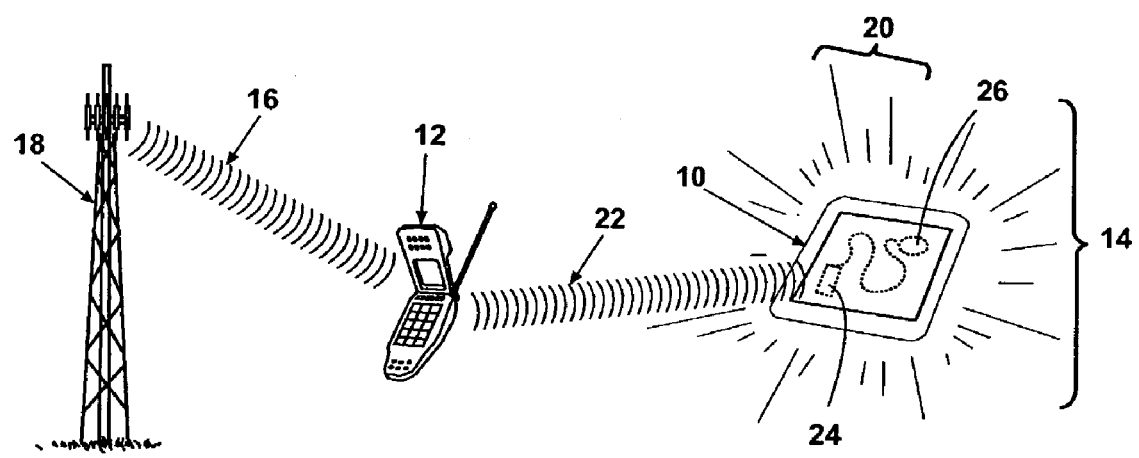
FIG. 2 is a schematic view showing the telecommunications device of FIG. 1 wherein the remote notification device is associated with the telecommunications device by a wireless link.

The link 22 preferably extends between a suitable port on the telecommunications device 12 and a transceiver 24 located on the indicator 10. It will be understood that the type of link is not limiting the scope of this invention as a wired link 22 is shown in FIG. 1 and a wireless link 22 is shown in FIG. 2 (wherein like reference numerals which identify common components of the invention between FIGS. 1 and 2 are identified with like reference numerals).

The transceiver 24 is operably interconnected to a signal emitter 26 which, as is described herein, emits the suitable indicator signal 20.

It will be understood that the instant invention relates to notification to a user 14 of the presence of an incoming telecommunications signal 16 to a user's telecommunications device 12. It will be understood that the specific nature of the user's telecommunications device 12 is not critical to the invention and can comprise any of the plethora of commercially-available telecommunications devices such as cellular telephones, pagers, personal desktop assistants (PDAs), cordless telephones, satellite telephones, and the like.

The specific embodiment of the telecommunications device 12 shown in the drawings as a cellular telephone shall not be limiting on the construction of the term telecommunications device as used in this application since and wired- or wireless-based communications device can be employed without departing from the scope of this invention. Further, the telecommunications transmitter 18 is also shown by example in the drawings as a cellular telephone tower, and this pictorial representation shall not be limiting on the construction of the term "telecommunications originator" as used in this specification as well.

The remote notification device 10 is in operable communication the communication device 12 such as a cellular phone or pager that alerts the user 14 that the personal communication device 12 is receiving an incoming call, message, or page as represented by the incoming telecommunications signal 16 in FIG. 1. A user 14 who is not able to see, hear, or feel the communication device 12 is alerted to the incoming communications signal 16 by the device 10, which is operable contact with the user 14, and alerts the user 14 with, for example, an emitted signal 20 such as a light, sound or tactile sensation.

The remote notification device 10 is preferably designed so as to permit the user 14 to not alter his or her desired appearance in social situations. The remote notification device 10 is preferably easily concealable or integral to the user 14, an article of clothing worn on the user 14, piece of jewelry worn by the user 14, a piercing in the user 14, or accessory that the user 14 desires to wear or carry independent of the desire to be notified of incoming calls, messages, or pages.

Several locations for the remote notification device as associated with the user 14 are contemplated in connection with this invention and described below with reference to FIGS. 3–6. It will be understood that the associations with the user 14 shown in FIGS. 3–6 are by example only and that other associations of the device 10 with the user 14 are also contemplated without departing from the scope of the invention.

Figure 3:
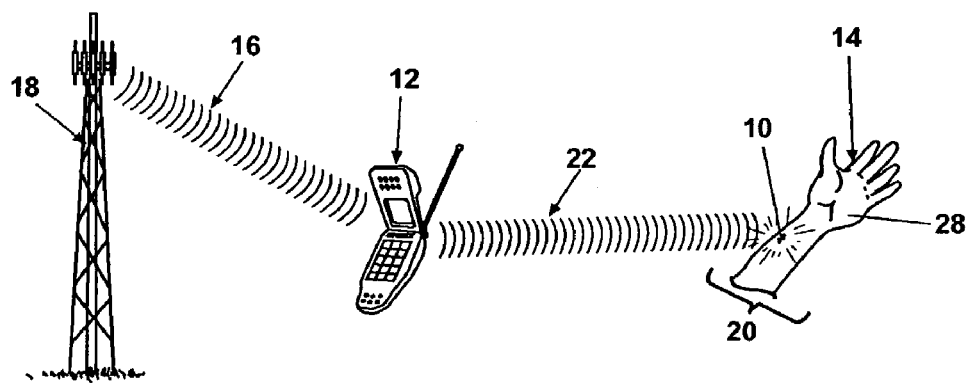
FIG. 3 is a perspective view showing a first embodiment of the remote notification device of FIG. 1 mounted to human skin and wherein the remote notification device is associated with the telecommunications device by a wireless link.

A first embodiment of the association of the remote notification device 10 with the user 14 is shown in FIG. 3 wherein the remote notification device is mounted to the user's skin and wherein the remote notification device 10 is associated with the telecommunications device 12 by a wireless link 22. The example association shown in FIG. 3 is a dermal patch removably mounted on the user's skin (e.g., a user's hand 28) in which the remote notification device 10 is embedded. The dermal patch containing the remote notification device 10 can be provided with an aesthetically-pleasing color, such as a skin tone color, or, alternatively, worn on the user's skin in an area typically concealed by clothing. In addition, the dermal patch can have a separate adhesive portion which can alternatively be disposable so that the dermal patch can be reused upon expiry of the adhesive portion.

Figure 4A:
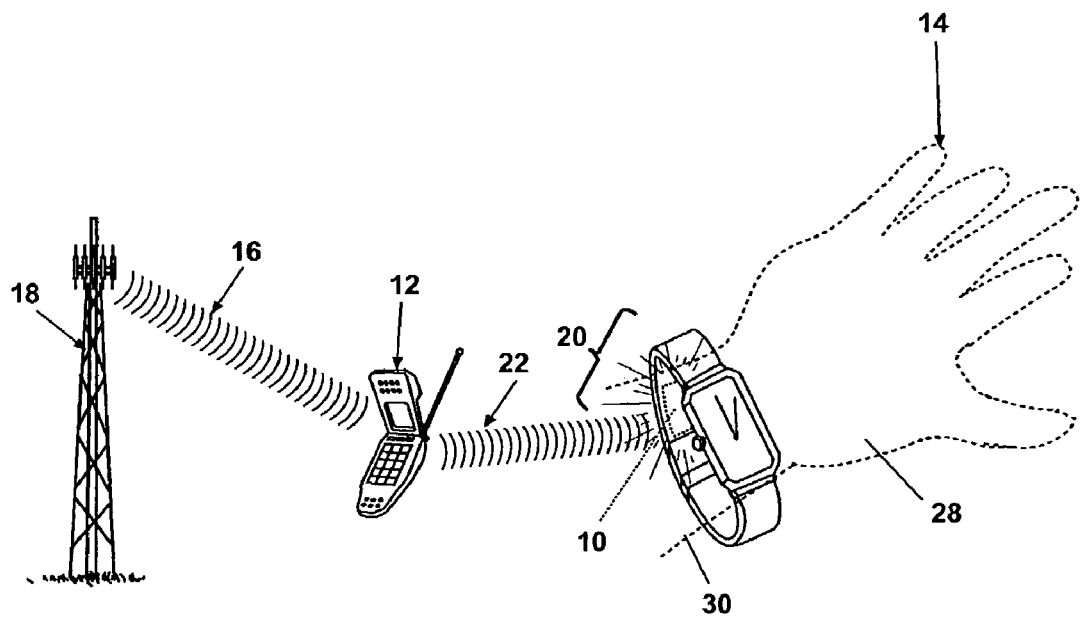
FIG. 4A is a perspective view showing a second embodiment of the remote notification device of FIG. 1 mounted to a bodily-worn accessory such as a watch, bracelet or anklet and wherein the remote notification device is associated with the telecommunications device by a wireless link.

A second embodiment of the association of the remote notification device 10 with the user 14 is shown in FIG. 4A wherein the remote notification device 10 is mounted to a bodily-worn accessory such as a watch, bracelet or anklet and wherein the remote notification device 10 is associated with the telecommunications device by a wireless link 22. The bodily-worn accessory shown in FIG. 4A is a watch which has the remote notification device 10 associated therewith, but it would be apparent to one skilled in the art that an anklet or bracelet could be substituted for the watch shown in FIG. 4A without departing from the scope of this invention.

Figure 4B:
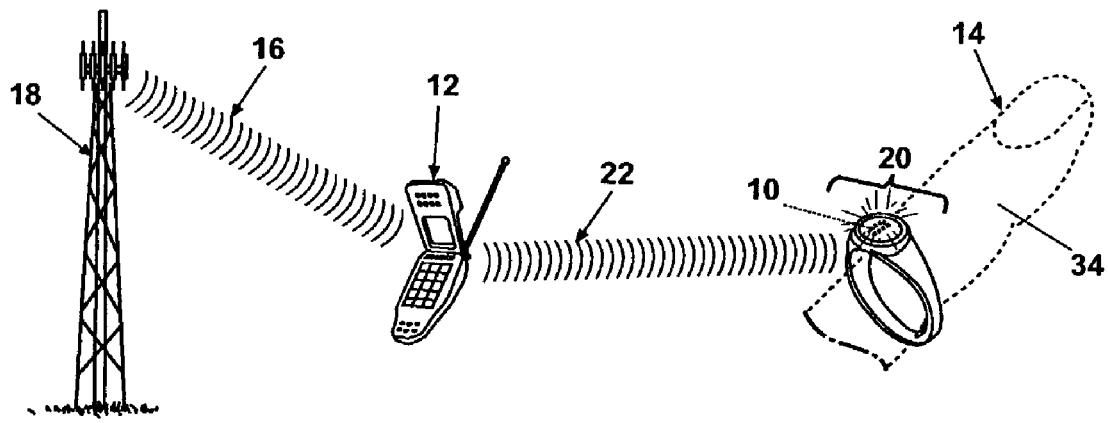
FIG. 4B is a perspective view showing the second embodiment of the remote notification device of FIG. 1 mounted to a bodily-worn accessory such as a ring and wherein the remote notification device is associated with the telecommunications device by a wireless link.

FIG. 4B shows the second embodiment association of the remote notification device 10 with a bodily-worn accessory of a user 14 the specific embodiment of the bodily-worn accessory in FIG. 4B is a ring worn on a finger 32 of the user 14.

Figure 4C:
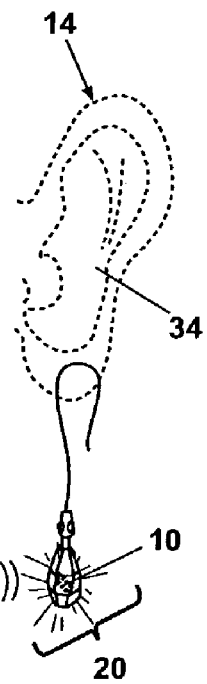
FIG. 4C is a perspective view showing the second embodiment of the remote notification device of FIG. 1 mounted to a bodily-worn accessory such as an adornment in a body piercing and wherein the remote notification device is associated with the telecommunications device by a wireless link.
Figure 4C:
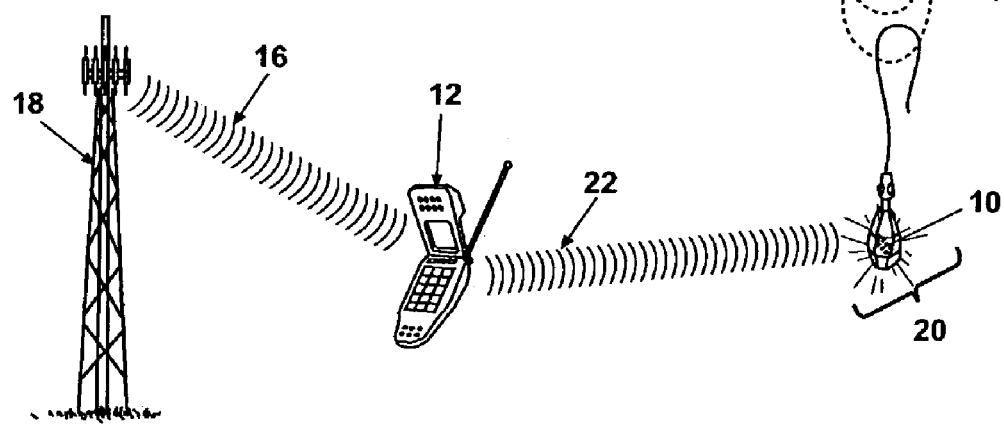

FIG. 4C shows the second embodiment association of the remote notification device 10 with a bodily-worn accessory of a user 14 wherein the specific embodiment of the bodily-worn accessory in FIG. 4C is an adornment in a body piercing, such as an earring worn in an ear 34 of the user 14.

Figure 4D:
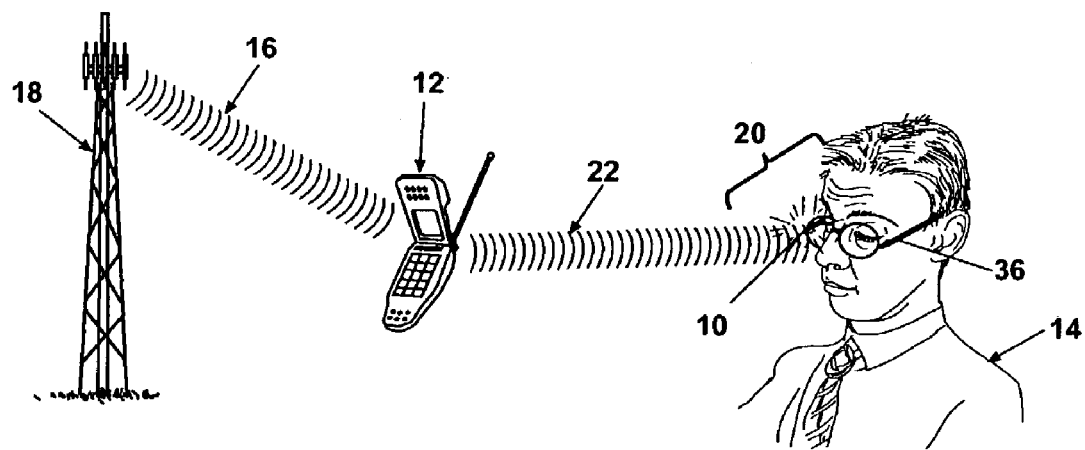
FIG. 4D is a perspective view showing the second embodiment of the remote notification device of FIG. 1 mounted to a bodily-worn accessory such as eyeglasses and wherein the remote notification device is associated with the telecommunications device by a wireless link.

FIG. 4D shows the second embodiment association of the remote notification device 10 with a bodily-worn accessory of a user 14 the specific embodiment of the bodily-worn accessory in FIG. 4D is a pair of eyeglasses 36 worn by the user 14.

Figure 5A:
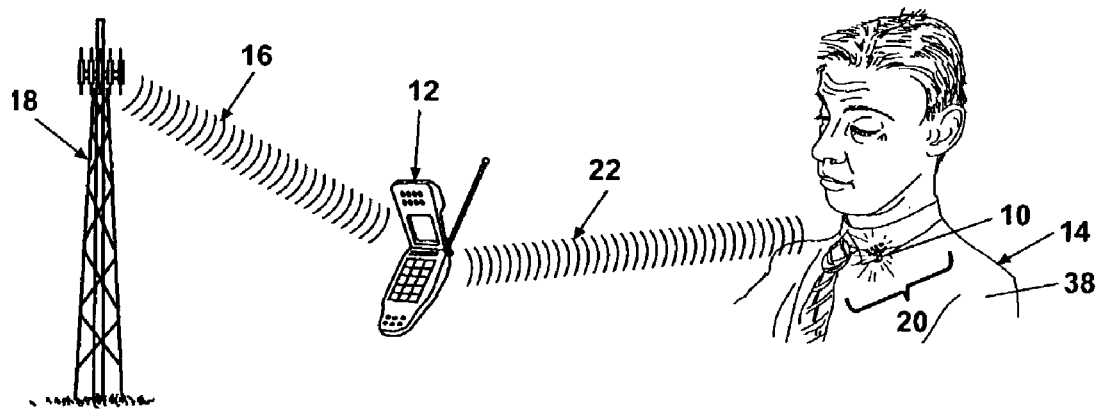
FIG. 5A is a perspective view showing a third embodiment of the remote notification device of FIG. 1 mounted to bodily-worn clothing such as a clip that attaches to a collar of a shirt and/or a blouse the remote notification device is associated with the telecommunications device by a wireless link.

A third embodiment of the association of the remote notification device 10 with the user 14 is shown in FIG. 5A wherein the remote notification device 10 is mounted to bodily-worn clothing such as a clip that attaches to a collar of a shirt and/or a blouse 38 of the user 14 wherein the remote notification device is associated with the telecommunications device by a wireless link 22. It will be understood that the remote notification device 10 can be embedded and/or sewed within the clothing 38 or fastened thereto by a clip, snap; button, hook-and-loop fastener attachment (e.g., VELCROÂ®) or other means which would be apparent to one skilled in the art. In addition, the clothing 38, while shown by example as a shirt and/or blouse 38, can comprise any bodily-worn accessory such as a pair of pants, socks, T-shirt, underwear, coat, suit, sport coat, jacket and the like.

Figure 5B:
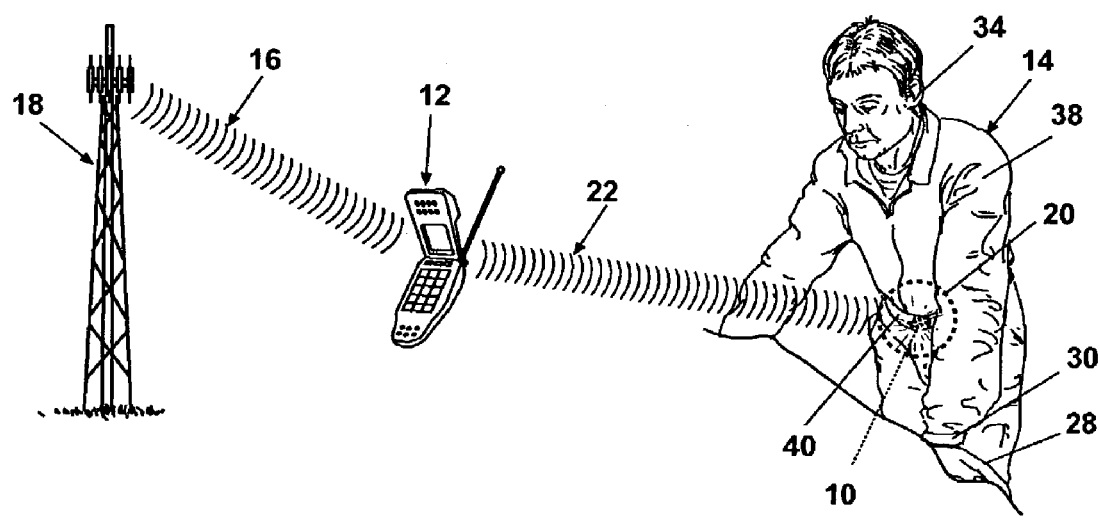
FIG. 5B is a perspective view showing a third embodiment of the remote notification device of FIG. 1 mounted to bodily-worn clothing such as a buckle or strap for a bra, underwire or belt buckle wherein remote notification device is associated with the telecommunications device by a wireless link.

FIG. 5B shows the third embodiment association of the remote notification device 10 with a bodily-worn clothing 38 of a user 14 wherein the specific embodiment of the bodily-worn clothing 38 in FIG. 5B is bodily-worn clothing such as a buckle or strap for a bra, underwire or belt buckle 40 of a user 14 wherein the remote notification device 10 is associated with the telecommunications device by a wireless link 22.

Figure 5C:
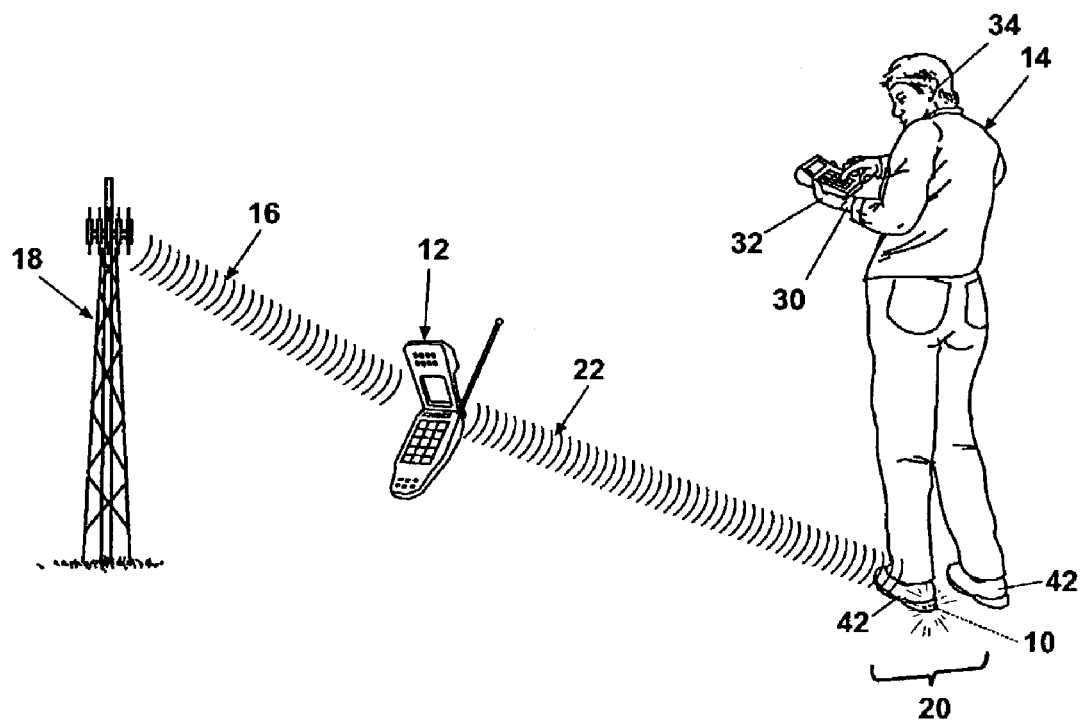
FIG. 5C is a perspective view showing a third embodiment of the remote notification device of FIG. 1 mounted to bodily-worn clothing such as a shoe wherein the remote notification device is associated with the telecommunications device by a wireless link.

FIG. 5C shows the third embodiment association of the remote notification device 10 with a bodily-worn clothing 38 of a user 14 wherein the specific embodiment of the bodily-worn clothing 38 in FIG. 5C is bodily-worn clothing such as a shoe 42 of a user 14 wherein the remote notification device 10 is associated with the telecommunications device by a wireless link 22.

Figure 6:
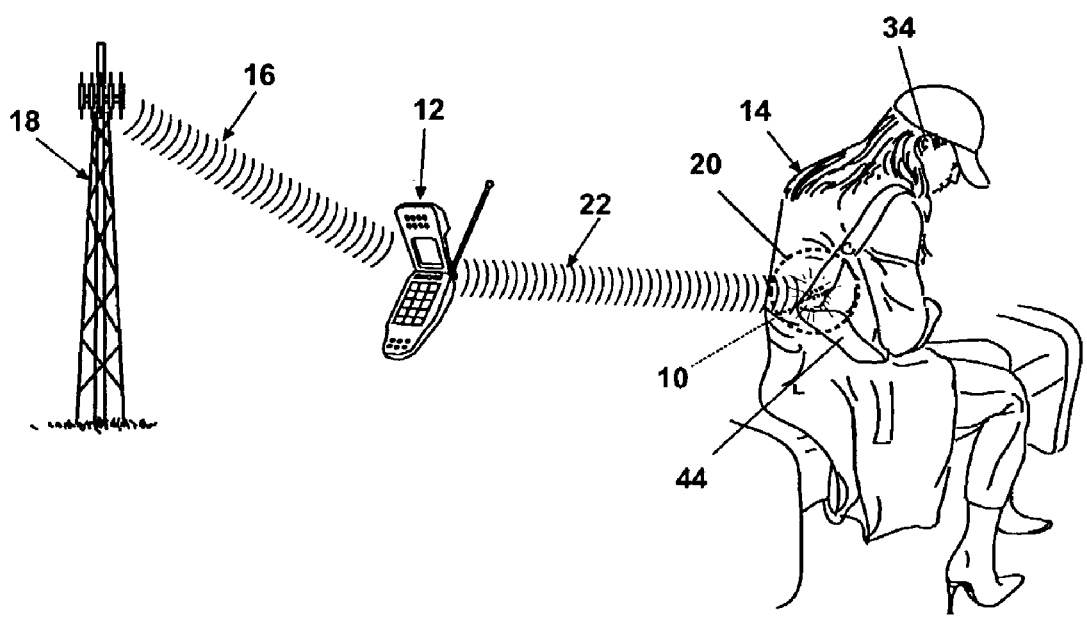
FIG. 6 is a perspective view showing a fourth embodiment of the remote notification device of FIG. 1 mounted to bodily-carried accessory such as a purse, sport sack or bag wherein the remote notification device is associated with the telecommunications device by a wireless link.

A fourth embodiment of the association of the remote notification 10 with the user 14 is shown in FIG. 6 wherein the remote notification device 10 is mounted to a bodily-carried accessory 44 such as a handbag of the user 14 wherein the remote notification device 10 is associated with the telecommunications device 12 by a wireless link 22. It will be understood that the remote notification device 10 can be embedded and/or sewed within the accessory 44 or fastened thereto by a clip, snap, button, hook-and-loop fastener attachment (e.g., VELCROÂ®) or other means which would be apparent to one skilled in the art. In addition, the accessory 44, while shown by example as a woman's handbag, can comprise any bodily-carried accessory 44 such as a purse, duffel bag, suitcase, satchel, handbag, sports sack, and the like.

In summary, the present invention provides a remote notification device 10 that alerts a user 14 of a personal communication device 12 such as a cellular phone or pager of an incoming telecommunications signal 16 such as a call, message, or page in situations where the user 14 is neither in sight of, able to hear, nor in physical contact with the personal communication device 12, without altering the user's desired aesthetic appearance.

Figure 7:
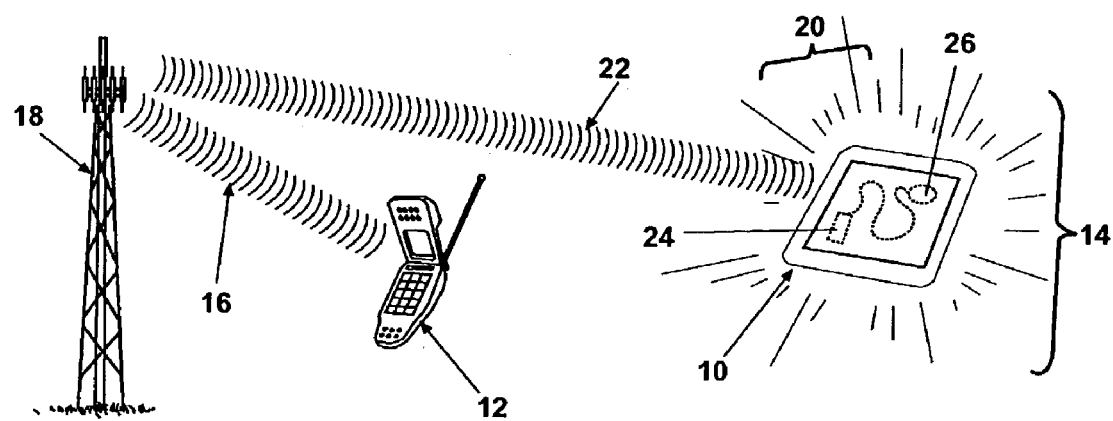
FIG. 7 is a perspective view showing an alternative method by which the remote notification device is provided a signal representative of an incoming telecommunication signal directly from a telecommunications source, rather than from the telecommunications device.

It will be understood that the origin of the link 22 is shown by example only as coming from the telecommunications device 12. The link 22 can also originate from the telecommunications source 18 or any other suitable source of a telecommunications signal, including but not limited to a satellite, a cellular telecommunications antenna or tower, another cellular or another telecommunications device 12, and the like. For example, FIG. 7 shows a perspective view showing an alternative method by which the remote notification device 10 is provided a signal 22 representative of an incoming telecommunication signal (which corresponds to the link 22) directly from a telecommunications source 18 (shown by example in FIG. 7 as a cellular telecommunications tower 18), rather than from the telecommunications device 12.

Although the present invention has been described in terms of specific exemplary embodiments, it will be appreciated that various modifications and alterations might be made by those skilled in the art without departing from the spirit and scope of the invention as set forth in the following claims.

The invention claimed is:

1. A personal communications system comprising:
    a telecommunications device capable of both receiving a first incoming communication signal and generating a second indicator signal representative of the presence of the first incoming communication signal; and
    a remote notification device, separate and distinct from the telecommunications device, associated with a user of the telecommunications device and operably interconnected thereto for detecting the second indicator signal and providing a sensory indication to the user upon detection of the second indicator signal,
    wherein, when the user is located out of sensory contact with the telecommunications device, the user can receive the sensory indication from the remote notification device in response to the telecommunications device receiving the first incoming communication signal, and wherein the remote notification device is configured to be worn by the user in at least one of a concealed manner and a manner integral to a conventional bodily-worn accessory.

2. The system of claim 1 wherein the operable communication between the telecommunications device and the remote notification device is a wireless link.

3. The system of claim 2 wherein the first incoming communication signal comprises at least one of an incoming page and an incoming telephone call to the telecommunications device.

4. The system of claim 3 wherein the first incoming communication signal is received via a first telecommunications protocol and the second indicator signal is generated via a second telecommunications protocol, the second telecommunications protocol being different than the first telecommunications protocol.

5. The system of claim 1 wherein the remote notification device is worn integral to the skin of a user.

6. The system of claim 5 wherein the remote notification device is worn on a dermal patch removably mounted to the skin of a user.

7. The system of claim 5 wherein the remote notification device is configured to have a decorative appearance.

8. The system of claim 1 wherein the remote notification device is worn integral to a bodily-worn accessory of a user.

9. The system of claim 8 wherein the bodily-worn accessory is a watch.

10. The system of claim 8 wherein the bodily-worn accessory is a bracelet.

11. The system of claim 8 wherein the bodily-worn accessory is an anklet.

12. The system of claim 8 wherein the bodily-worn accessory is a ring.

13. The system of claim 8 wherein the bodily-worn accessory is an accessory received in a body piercing.

14. The system of claim 8 wherein the bodily-worn accessory is eyeglasses.

15. The system of claim 8 wherein the sensory indication is visual.

16. The system of claim 8 wherein the sensory indication is audible.

17. The system of claim 8 wherein the sensory indication is tactile.

18. The system of claim 1 wherein the remote notification device is worn with a bodily-worn clothing of a user.

19. The system of claim 18 wherein the remote notification device is clipped to a bodily-worn clothing of a user.

20. The system of claim 18 wherein the sensory indication is visual.

21. The system of claim 18 wherein the sensory indication is audible.

22. The system of claim 18 wherein the sensory indication is tactile.

23. The system of claim 1 wherein the remote notification device is worn integral to a bodily-carried accessory of a user.

24. The system of claim 23 wherein the bodily-worn accessory is at least one of a carry bag and a purse.

25. The system of claim 23 wherein the sensory indication is visual.

26. The system of claim 23 wherein the sensory indication is audible.

27. The system of claim 23 wherein the sensory indication is tactile.

28. A remote notification device for a user of a telecommunications device, the telecommunications device capable of both receiving a first incoming communication signal and generating a second indicator signal representative of the presence of the first incoming communication signal, the remote notification device comprising:
  a remote notification device, separate and distinct from the telecommunications device, associated with the user of the telecommunications device and adapted to be operably interconnected thereto for detecting the second indicator signal and providing a sensory indication to the user in response to detection of the second indicator signal;
  wherein a user located out of sensory contact with the telecommunications device receives the sensory indication from the remote notification device in response to the telecommunications device receiving the first incoming communication signal, and wherein the remote notification device is configured to be worn by the user in at least one of a concealed manner and a manner integral to a conventional bodily-worn accessory.

29. The remote notification device of claim 28 wherein the remote notification device is adapted to be operably interconnected to the telecommunications device by a wireless link.

30. The remote notification device of claim 29 wherein the first incoming communication signal comprises at least one of an incoming page and an incoming telephone call to the telecommunications device.

31. The remote notification device of claim 30 wherein the first incoming communication signal is received via a first telecommunications protocol and the second indicator signal is generated via a second telecommunications protocol, the second telecommunications protocol being different than the first telecommunications protocol.

32. The remote notification device of claim 28 wherein the remote notification device is worn integral to the skin of a user.

33. The remote notification device of claim 32 wherein the remote notification device is worn on a dermal patch removably mounted to the skin of a user.

34. The remote notification device of claim 32 wherein the remote notification device is configured to have a decorative appearance.

35. The remote notification device of claim 28 wherein the remote notification device is worn integral to a bodily-worn accessory of a user.

36. The remote notification device of claim 35 wherein the bodily-worn accessory is a watch.

37. The remote notification device of claim 35 wherein the bodily-worn accessory is a bracelet.

38. The remote notification device of claim 35 wherein the bodily-worn accessory is an anklet.

39. The remote notification device of claim 35 wherein the bodily-worn accessory is a ring.

40. The remote notification device of claim 35 wherein the bodily-worn accessory is an accessory received in a body piercing.

41. The remote notification device of claim 35 wherein the bodily-worn accessory is eyeglasses.

42. The remote notification device of claim 35 wherein the sensory indication is visual.

43. The remote notification device of claim 35 wherein the sensory indication is audible.

44. The remote notification device of claim 35 wherein the sensory indication is tactile.

45. The remote notification device of claim 28 wherein the remote notification device is worn with a bodily-worn clothing of a user.

46. The remote notification device of claim 45 wherein the remote notification device is clipped to a bodily-worn clothing of a user.

47. The remote notification device of claim 45 wherein the sensory indication is visual.

48. The remote notification device of claim 45 wherein the sensory indication is audible.

49. The remote notification device of claim 45 wherein the sensory indication is tactile.

50. The remote notification device of claim 28 wherein the remote notification device is worn integral to a bodily-carried accessory of a user.

51. The remote notification device of claim 50 wherein the bodily-worn accessory is at least one of a carry bag and a purse.

52. The remote notification device of claim 50 wherein the sensory indication is visual.

53. The remote notification device of claim 50 wherein the sensory indication is audible.

54. The remote notification device of claim 50 wherein the sensory indication is tactile.

55. A method of remotely notifying a user of the presence of an incoming signal originated from a telecommunications transmitter to a telecommunications device associated with the user when the user is out of sensory contact with the telecommunications device, the method comprising the steps of:
- providing a remote notification device, separate and distinct from the telecommunications device, in sensory contact with the user, wherein the remote notification device is configured to be worn by the user in at least one of a concealed manner and a manner integral to a conventional bodily-worn accessory;
- generating a notification signal to the remote notification device representative of the incoming signal between the telecommunications transmitter and the telecommunications device; and
- detecting, at the remote notification device, the presence of the signal representative of the incoming signal.

56. The method of claim 55 and further comprising the step of notifying the user by providing, from the remote notification device, a sensory indication of the presence of the signal representative of the incoming signal.

57. The method of claim 56 wherein the sensory indication comprises a visual sensory indication.

58. The method of claim 56 wherein the sensory indication comprises an audible sensory indication.

59. The method of claim 56 wherein the sensory indication comprises a tactile sensory indication.

60. The method of claim 55 and further comprising the step of operably coupling the telecommunications device and the remote notification device by a wireless link.

61. The method of claim 55 wherein the first incoming signal comprises at least one of an incoming page and an incoming telephone call to the telecommunications device.

62. The method of claim 55 and further comprising the step of wearing the remote notification device integral to the skin of the user.

63. The method of claim 62 wherein the remote notification device is worn on a dermal patch removably mounted to the skin of a user.

64. The method of claim 63 wherein the remote notification device is configured to have a decorative appearance.

65. The method of claim 55 and further comprising the step of wearing the remote notification device integral to a bodily-worn accessory of a user.

66. The method of claim 55 and further comprising the step of wearing the remote notification device with a bodily-worn clothing of a user.

67. The method of claim 55 and further comprising the step of wearing the remote notification device integral with a bodily-carried accessory of a user.

68. The method of claim 55 wherein the notification signal originates with the telecommunications transmitter.

69. The method of claim 55 wherein the notification signal originates with the telecommunications device.

* * * * *